Figure 2:
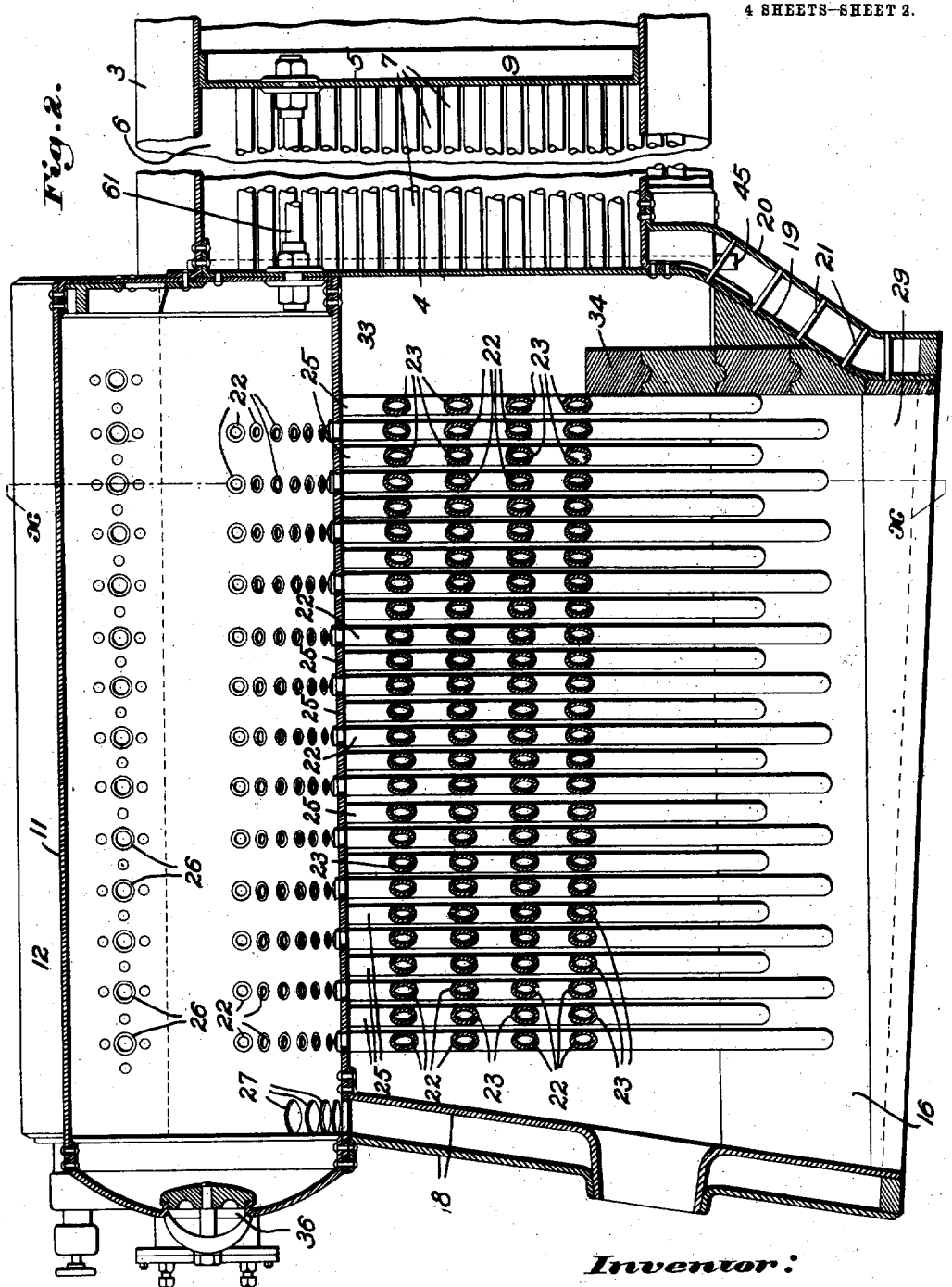

J. M. McCLELLON.
FIRE BOX FOR LOCOMOTIVE BOILERS.
APPLICATION FILED OCT. 25, 1909.
Reissued Feb. 21, 1911. 13,210.
4 SHEETS—SHEET 1.
*Fig. 1.*
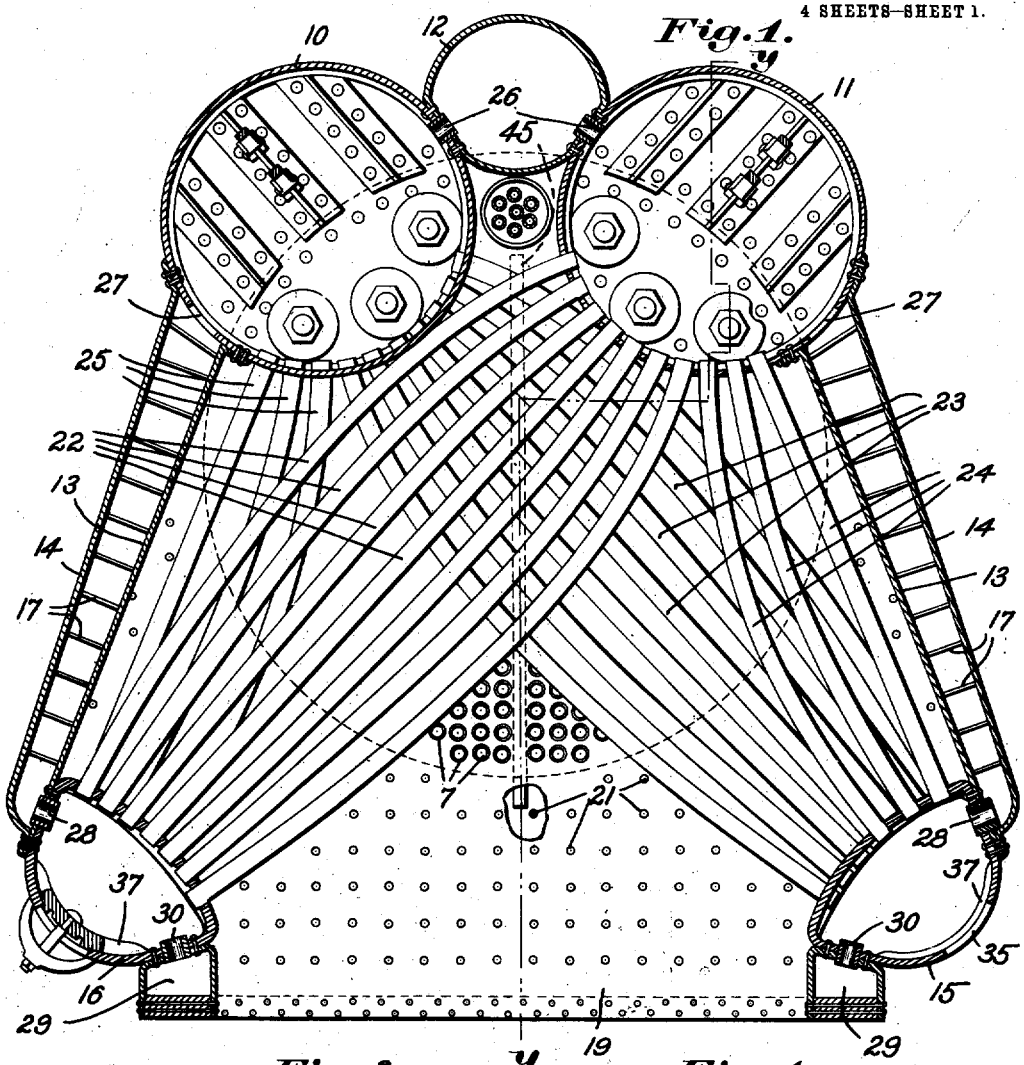
*Fig. 3.*
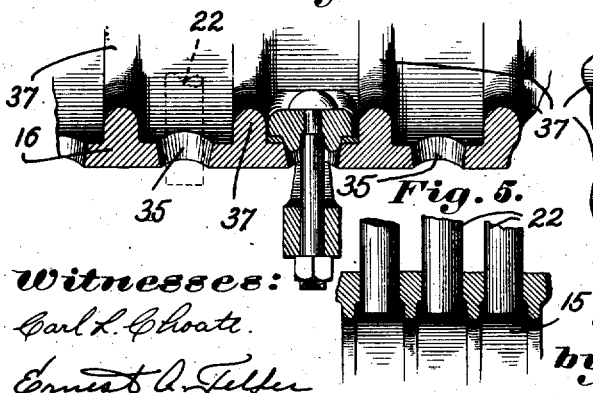
*Fig. 4.*
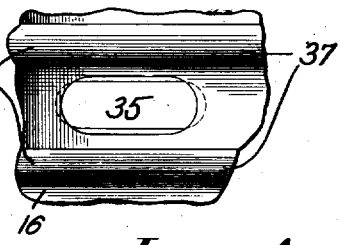
*Fig. 5.*
Witnesses:
Earl L. Choate.
Ernest A. Telfer
Inventor:
James M. McClellon
by Emery & Booth
Att'ys.
THE NORRIS PETERS CO., WASHINGTON, D. C.

J. M. McCLELLON.

FIRE BOX FOR LOCOMOTIVE BOILERS.

APPLICATION FILED OCT. 25, 1909.

Reissued Feb. 21, 1911.

13,210.

4 SHEETS—SHEET 2.

Witnesses:
Carl L. Choate
Ernest A. Telfer

Inventor:
James M. McClellon
by Emery & Booth
Att'ys.

THE NORRIS PETERS CO., WASHINGTON, D. C.

J. M. McCLELLON.

FIRE BOX FOR LOCOMOTIVE BOILERS.

APPLICATION FILED OCT. 25, 1909.

Reissued Feb. 21, 1911.

13,210.

4 SHEETS—SHEET 3.

Witnesses:
Carl L. Choate
Ernest A. Telfer

Inventor:
James M. McClellon
by Emery & Booth
Att'ys.

THE NORRIS PETERS CO., WASHINGTON, D. C.

J. M. McCLELLON.

FIRE BOX FOR LOCOMOTIVE BOILERS.

APPLICATION FILED OCT. 25, 1909.

Reissued Feb. 21, 1911.

13,210.

4 SHEETS—SHEET 4.

Witnesses

Carl L. Choate

Ernest A. Tuffer

Inventor:

James M. McClellon by Emery & Booth

Att'ys.

THE NORRIS PETERS CO., WASHINGTON, D. C.

UNITED STATES PATENT OFFICE.

JAMES M. McCLELLON, OF EVERETT, MASSACHUSETTS.

FIRE-BOX FOR LOCOMOTIVE-BOILERS.

13,210. Specification of Reissued Letters Patent. Reissued Feb. 21, 1911.

Original No. 870,306, dated November 5, 1907, Serial No. 348,789. Application for reissue filed October 25, 1909. Serial No. 525,286.

*To all whom it may concern:*

Be it known that I, JAMES M. McCLELLON, a citizen of the United States, and a resident of Everett, in the county of Middlesex and State of Massachusetts, have invented an Improvement in Fire-Boxes for Locomotive-Boilers, of which the following description, in connection with the accompanying drawing, is a specification, like letters on the drawing representing like parts.

This invention relates to boilers and has been shown as embodied in a locomotive boiler although some of the features of the invention may be embodied in boilers of other types. The common form of locomotive boiler now in use is of the tubular or fire-tube type, but of necessity the heating surface in the fire-box of such a boiler is more or less limited. It has been proposed to increase such heating surface by placing water-tubes in the fire-box, and it is this type of boiler which I have herein shown.

Under ordinary circumstances the hot gases are passed from the grate into and through the flues of the boiler with such rapidity that the water does not have time to absorb the maximum number of heat units from them. In my present invention I have aimed not only to provide a greatly increased heating surface within the combustion chamber by the use of water-tubes, but have also aimed to so arrange these water-tubes that they will baffle the hot gases to some extent and thus delay them in passing to the flues, so as to give opportunity for the hot gases to yield up a greater quantity of the heat units to the water in the water-tubes.

My invention is of such a nature that when applied to a fire-box of a boiler the stayed surfaces are eliminated as far as possible by substituting drums for the usual crown-sheet, and in addition a fire-box embodying my invention is of such a construction that it may be used with any existing type of locomotive boiler and may, if desired, be substituted for the fire-boxes now in use in locomotive boilers. While as just stated, my improved fire-box may be used with boilers of any type, I have chosen herein to illustrate it as used in connection with a locomotive boiler of the type shown in my co-pending application Ser. No. 216,315, filed July 13, 1904. In the boiler shown in said application the barrel of the boiler constitutes a water-containing chamber which is separate from the steam and water spaces around the fire-box, and communication between said barrel and said steam and water spaces is afforded so that the water flows from said barrel into the steam and water spaces around the fire-box, which constitute the steam-generating portion of the boiler, while the barrel of the boiler constitutes a means for heating the water rather than a means for generating steam. For a more complete description of this boiler reference may be had to said application. My invention, however, is not limited to use in connection with this type of boiler as it may be used with any type of locomotive boiler.

I will now proceed to describe some embodiments of my invention and then point out the novel features thereof in the appended claims.

Figure 6:
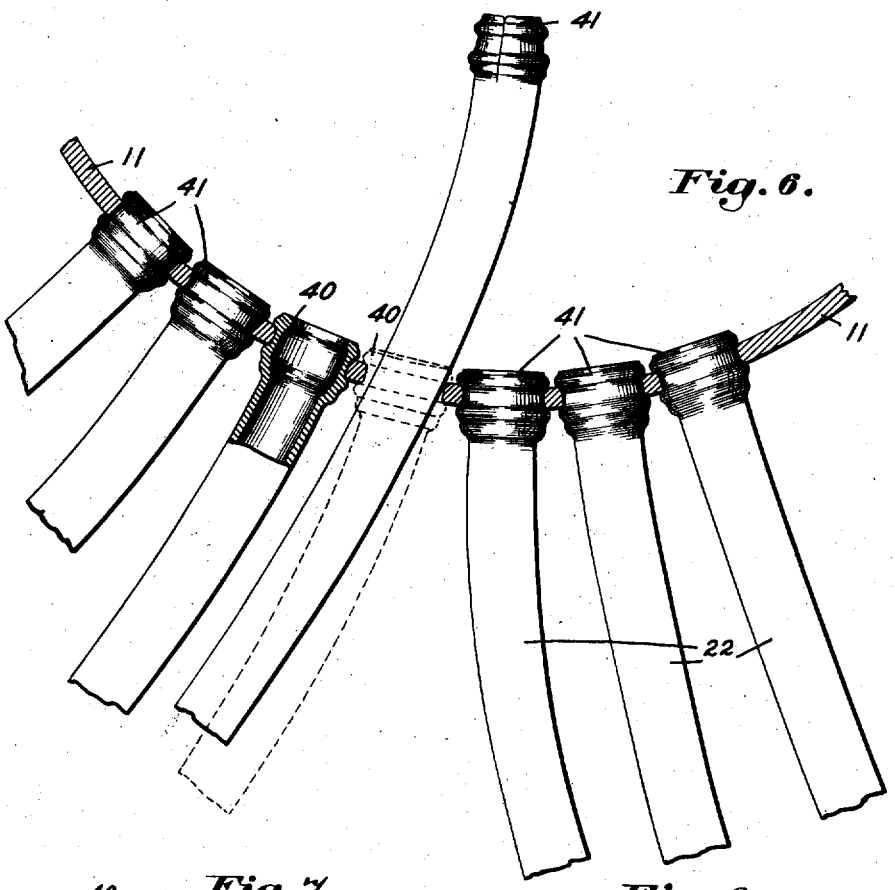
Figure 7:
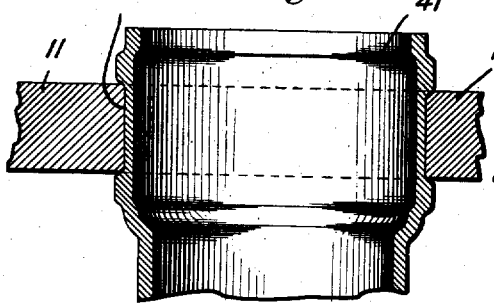
Figure 8:
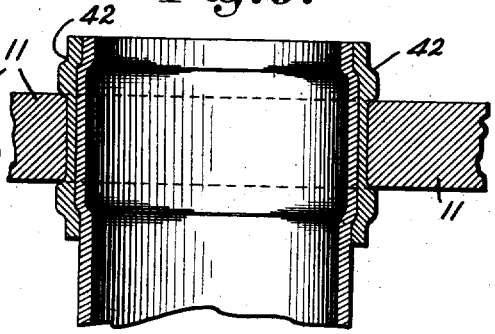
Figure 9:
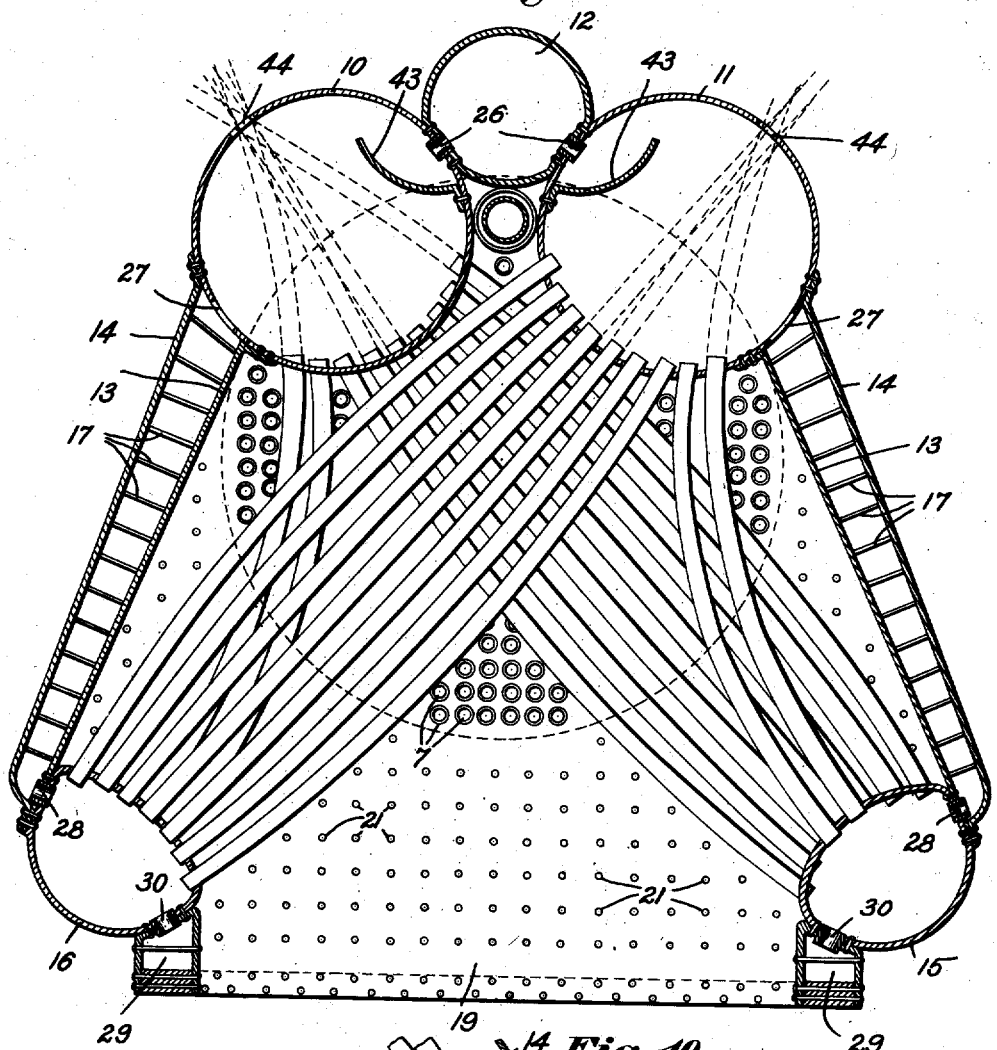
Figure 10:
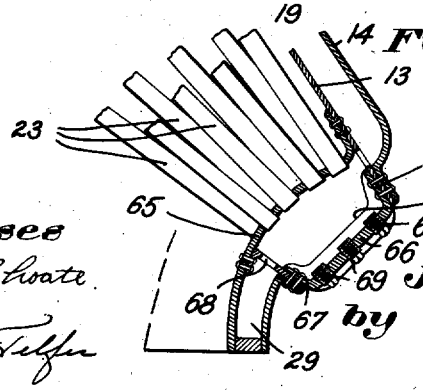

Referring to the drawings, Figure 1 is a vertical transverse section through a fire-box of a locomotive embodying my invention on substantially the line $x$—$x$, Fig. 2 showing the bridge wall removed; Fig. 2 is a vertical longitudinal section on substantially the line $y$—$y$, Fig. 1, said Fig. 2 showing part of the shell of the boiler; Figs. 3, 4 and 5 are details hereinafter referred to; Fig. 6 on an enlarged scale shows a portion of one of the drums showing the water-tube expanded therein; Figs. 7 and 8 are details showing different ways of expanding the water-tubes into the drum; Fig. 9 is a vertical transverse section through a fire-box showing a slightly different form of the invention; Fig. 10 is a sectional view through a lower drum showing a different form of the invention.

In Fig. 2 I have shown only a portion of the shell 3 of the boiler, and said shell is shown as having two flue-sheets 4 and 5 forming between them a chamber 6 through which extend the usual flues 7, said flues opening at one end into the combustion chamber 8 of the fire-box, and at the other into the smoke chamber at the front end of the locomotive boiler.

In the embodiment of the invention herein shown the top of the fire-box is formed by the drums 10, 11 and 12, these drums extending the full length of the fire-box and taking the place of the usual crown-sheet. The sides of the fire-box are formed by sheets 13 and 14 which extend from the outside drums 10 and 11 down to the lower drums 15 and 16, said sheets 13 and 14 on each side of the boiler being spaced from each other to form water legs and stayed by means of usual stay-bolts 17. The door end of the fire-box is also formed by other sheets 18 which are spaced from each other to form a water-leg and may be stayed in usual manner. At the opposite or back end of the fire-box the flue sheet 4 is shown as being extended down below the shell 3, as at 19, and a sheet 20 is employed which is secured at its upper side to the under side of the shell 3 and which forms with the sheet 19 a water-leg, said sheets 19 and 20 also being preferably stayed, as at 21. The outside drums 10 and 11 are preferably separated slightly from each other, and the space between them is closed by the central drum 12 which constitutes the steam-dome from which the steam is taken to the engine cylinders. The two drums 10 and 11 have communication with the steam-dome 12 through the nipples or apertures 26, and each of the drums 10 and 11 have communication with the water-legs at the sides and door end of the fire-box through apertures 27. These water-legs also communicate with the lower drums 15 and 16 through nippled apertures 28.

Situated below each of the lower drums 15 and 16 is a small water-leg or mud-ring 29 which has communication with the lower drums through suitable nippled apertures 30. This mud-ring 29 communicates at one end with the water-leg formed between the two sheets 18, and the other end with the water-leg formed between the two sheets 19 and 20.

Situated within the fire-box are nests of water-tubes which connect the upper drums 10 and 11 with the lower drums 15 and 16. These nests of water-tubes have been arranged so as to cover or baffle as far as possible the entrance to the flues 7 in the flue-sheet 4 and thus practically to eliminate all direct passages for the hot gases between the grate and the flues 7; as a result the hot gases are compelled to pass through the net-work of water-tubes in transit to the flues 7, and in this way the greatest possible efficiency can be produced. In the present embodiment of my invention the nests of water-tubes are arranged in four series. One series of nests extend between the upper drum 11 and the lower drum 16; another series of nests, to wit: the water-tubes 23, extend between the upper drum 10 and the lower drum 15; a third series of nests, that is, the water-tubes 24, extend between the upper drum 11 and the lower drum 15; and the fourth series, the water-tubes 25, extend between the upper drum 10 and the lower drum 16. The water-tubes 24 of any nest may be arranged in the same vertical plane as the water-tubes 22 of another nest; and similarly the nest of water-tubes 25 may occupy the same plane as a nest of water-tubes 23, as best seen in Figs. 1 and 2.

On referring to Fig. 1 it will be seen that the banks or nests of tubes 22 and 23 cross each other and practically cover the entire front of the flue-sheet 4 with the exception of small spaces at the sides, and that the banks or nests of water-tubes 24 and 25 cover the side spaces so that there is a net-work of water-tubes in front of or covering nearly the whole area of the flue-sheet 4. These water-tubes preferably will not extend clear back to the flue-sheet 4 as it is desirable to leave a slight space, as 33, between the water-tubes and the flue-sheet to provide necessary access to the flues 7 for removing or repairing them.

In order to prevent the hot gases from passing directly into the space 33 and thus directly into the flues 7 without going through the net-work of water-tubes, I propose to provide a bridge-wall 34 of tiling or other suitable material which will baffle the gases and compel them to pass through the net-work of water-tubes during their passage to the flues 7. This bridge-wall forces the gases to pass upwardly into the net-work of water-tubes and then forwardly through said net-work into the space 33, from which they pass to the flues 7, and in this way the gases are delayed in transit to the flues sufficiently so that the greatest number of heat units in them can be absorbed by the water in the water-tubes.

Each of the upper drums 10 and 11 is preferably made with a bumped outer end so as to avoid the necessity of staying said end, and each of the bumped ends is shown as having a man-hole 36 therein through which access may be had to the interior of the drums for expanding the water-tubes therein or cutting them therefrom. The opposite ends of the drums 11 and 12 will be stayed by any suitable or usual staying means, and if desired stay-rods 61 may be used which extend between the flue-sheets 4 and 5, said rods operating not only to stay said flue-sheets, but also to stay the lower portion of the front ends of the drums.

The lower drums 15 and 16 may be made of cast steel or they may be rolled into shape and preferably each will have a plurality of man-holes 35 in the side thereof, one man-hole being situated opposite each of the nests of water-tubes. These man-holes are shown as elongated and afford sufficient room for the insertion of a tool to expand the water-tubes into the drum, and also are of sufficient length so that any of the water-tubes may be removed therethrough. In Fig. 1 the lower drums are shown as being of cast steel and each is provided with ribs 37 on the inner face of its outer side for the purpose of strengthening it to make up for any loss of strength occasioned by the presence of man-holes.

In Fig. 10 I have shown a different form of lower header in which the side of the header that is subjected to the action of the hot gases from the fire-box is made of sheet metal, while the outer side is made of cast metal. As shown in Fig. 10, the inner side of the lower header is formed by a sheet 65 which is riveted at one end to the lower end of the sheet 13, and at the other end extends down to the lower end of the fire-box to form one side of the mud-ring 29. The outer wall 66 of the lower header may be made of cast metal and is provided with flanges 67, one of which is riveted to the lower edge of the sheet 13, and the other of which is riveted to a partition sheet 68 that separates the drum from the mud-ring. The cast-metal wall of the drum is provided with plugged apertures 69 through which the various water-tubes 23 may be removed, and said wall is also preferably strengthened by means of transversely-extending ribs 70.

In Fig. 9 I have illustrated a form of the invention in which the lower drums 15 and 16 are made entirely of sheet metal which are riveted and nippled both to the sheet 13 and to the mud-ring 29. In this embodiment the two upper drums 10 and 11 are shown as provided with baffle-plates 43 which are used for the purpose of preventing the water from being carried over into the steam-dome 12 by the rapid circulation of the steam. In this embodiment also the upper drums 10 and 11 are provided with apertures 44 so situated that any of the water-tubes may be removed therethrough as clearly shown in dotted lines, all of the water-tubes being curved especially with this end in view. In other respects the invention shown in Fig. 9 is similar to that shown in Fig. 1.

In order to make a good joint between each water-tube and the drum into which it is expanded, it is desirable that the water-tubes should enter the drum at substantially right angles, and to accomplish this I have curved the water-tubes, as shown in Fig. 1, so that each water-tube will enter both the upper and the lower drum in substantially a radial direction.

To facilitate the removal of the water-tubes I propose to make the holes 40 in the drums for receiving the water-tubes slightly larger than the diameter of said water-tubes, as shown best in Figs. 6, 7 and 8, so that said water-tubes can be readily turned or swung to one side in removing or replacing them laterally, as shown best in Fig. 6. Where the apertures 40 are thus larger than the water-tubes it will be necessary either to make the water-tubes with swelled ends, as at 41, see Fig. 7, or to employ a bushing 42 which surrounds the end of the water-tube and fills the enlarged aperture 40, as seen in Fig. 8.

Where the steam and water spaces around the fire-box are entirely separate from the chamber within the body of the shell 3, as in the boiler shown in my above-mentioned co-pending application, it is necessary to provide some means for delivering water from the shell of the boiler to these water spaces. In the present embodiment of my invention I have shown for this purpose a delivery-pipe 45 which is situated directly back of the flue-sheet 4, and the upper end of which is near the top of the chamber 3 while the lower end extends down through the bottom of the shell and into the water-leg formed between the sheets 19 and 20. The water is thus delivered from the top of the chamber 6 to the bottom of the water-spaces around the fire-box, and when the boiler is in operation the circulation of water in and around the fire-box is upwardly through the water-tubes from each of the lower drums 15, 16 to the upper drums 10 and 11, and then downwardly through the water-legs at the side of the fire-box to the lower drums 15, 16 again.

The construction herein shown has the following advantages: The fire-box is wide at its base and therefore capable of accommodating an extra wide grate thus affording an increased grate area; the water-tubes within the fire-box are so arranged that they cover practically the entire flue-sheet 4 and all hot gases which are delivered to the flues are forced through the net-work of water-tubes which are thus subjected to the hottest gases; the water-tubes act as a sort of baffle for the hot gases and serve to retard their progress toward the flues 7 sufficiently to permit the maximum amount of heat units to be absorbed by the water. This obviously results in a boiler capable of making steam very quickly and very rapidly. Other advantages of the construction are that all the water-tubes are readily accessible and any one can be removed without tearing the boiler to pieces, and further the fire-box may be used in connection with any common type of locomotive boiler.

I have not attempted herein to describe all forms which my invention may assume, but it will be obvious that substantially this same arrangement of drums and water-tubes might be embodied in a stationary or marine boiler by simply substituting a solid sheet for the flue-sheet 4, and providing a means of egress at the top of the boiler for the hot gases of combustion.

Claims.

1. In a boiler structure of the locomotive type the combination of a feed water heater in the form of the usual shell with flues therein; a fire-box at one end of said shell for supplying heat to said flues; obliquely arranged upright steam generating tubes substantially covering the entrance to said flues whereby the latter receive waste gases only from said fire-box; and means to conduct feed water from said shell directly to said tubes.

2. A unitary boiler structure of the locomotive type comprising, in combination, a feed water heater in the form of the usual shell with flues therein; a fire-box at one end of said shell for supplying heat to said flues; upright steam generating tubes distributed substantially throughout the length of the fire-box and arranged substantially to cover the entrance to said flues and means to conduct feed water from said shell to said tubes.

3. A boiler structure of the locomotive type comprising, in combination, a feed water heater in the form of the usual shell with flues therein; a fire-box at one end of said shell for supplying heat to said flues; a steam generator heated by said fire-box including a drum; and means to conduct water from said shell to said generator, said generator being constructed and arranged to prevent the steam generated therein from passing into said feed-water heater.

4. In a boiler structure of the locomotive type the combination of a feed water heater in the form of the usual shell with flues therein; a fire-box at one end of said shell having side walls, and a crown comprising a plurality of drums; steam generating tubes communicating with said drums; and means to provide communication from said shell to said drums only through said walls or generating tubes.

5. In a boiler structure of the locomotive type the combination of a feed water heater in the form of the usual shell with flues therein; a fire-box at one end of said shell supplying heat to said flues and including crown drums; and a water tube steam generator receiving water from said shell and delivering water and steam to said drums, the latter being constructed to prevent steam from returning from said drums to said shell.

6. In a boiler of the locomotive type the combination of a shell and its flues and a fire-box at one end of said shell, comprising laterally communicating top drums and means for conducting water from said shell to said drums.

7. In a boiler of the locomotive type the combination of a feed water heater in the form of the usual shell and its flues; a fire-box at one end of said shell supplying heat to said flues and having a top comprising a plurality of drums; and water tubes within said fire-box, said shell, water tubes and drums being connected in series in the order named.

8. In a boiler of the locomotive type the combination of a feed water heater in the form of a shell having flues and a flue sheet; a fire-box adjacent to the latter supplying heat to said flues; fire-box top drums secured to said sheet without communication therethrough and means to conduct water from said barrel through said fire-box into said drums.

9. In a boiler structure of the locomotive type, the combination with a shell having flues therethrough, of a fire-box having a water-chamber at the top and other chambers at the bottom on each side, and inclined water-tubes connecting each lower chamber with the upper chamber on the opposite side of the fire-box, said water-tubes covering substantially the entire end of the shell.

10. In a boiler of the locomotive type, the combination with a shell having flues extending therethrough, of a fire-box having two upper drums and two lower drums, one at each side thereof, water-tubes connecting the lower drum on each side to the upper drum on the opposite side and a water leg at each side of the fire-box connecting the upper and lower drums.

11. In a boiler of the locomotive type, the combination with a shell having flues extending therethrough, of a fire-box having two upper drums and two lower drums, one at each side thereof, and water-tubes connecting the lower drum on each side to the upper drum on the opposite side, said water-tubes covering substantially the full area of the end of the shell.

12. In a boiler of the locomotive type, the combination with a boiler shell having flues therethrough, of a fire-box at one end of the shell, said fire-box having two drums at the top thereof and a drum at each side at the bottom, the drums on each side being connected by a water-leg, and water-tubes connecting the lower drum on each side with the upper drum on the opposite side.

13. In a boiler of the locomotive type, the combination with a boiler shell having flues therethrough, of a fire-box at one end of the shell, said fire-box having two drums at the top thereof and a drum at each side at the bottom, the drums on each side being connected by a water-leg, and water-tubes connecting the lower drum on each side with the upper drum on the opposite side, said water-tubes covering substantially the full area of the end of the shell.

14. In a boiler structure of the locomotive type, the combination with a shell having flues therethrough, of a fire-box having a water-chamber at the top and other chambers at the bottom on each side, and inclined water-tubes connecting each lower chamber with the upper chamber on the opposite side of the fire-box, said water-tubes covering substantially the entire end of the shell, and means to cause all the hot gases generated in the fire-box to pass through the net work of water-tubes in transit to the flues.

15. In a boiler of the locomotive type, the combination with a boiler shell having flues therethrough, of a fire-box at one end of the shell, said fire-box having two drums at the top thereof and a drum at each side at the bottom, the drums on each side being connected by a water-leg, water-tubes connecting the lower drum on each side with the upper drum on the opposite side, said water-tubes covering substantially the full area of the end of the shell, and means to cause all the hot gases to impinge against the water-tubes in transit to the flues.

16. The combination with a boiler shell having a flue-sheet at one end and flues extending therethrough of a fire-box having two upper drums at its top, two lower drums one at each side, a water leg connecting the upper drum on each side to the lower drum on the same side, and water-tubes connecting each lower drum to the upper drum on the opposite side.

17. The combination with a boiler shell having a flue-sheet at one end and flues extending therethrough of a fire-box having two upper drums at its top, two lower drums, one at each side, a water leg connecting each upper drum with the lower drum on the same side, a water leg at the back of the fire-box connected to both lower drums, and water-tubes connecting each lower drum with the upper drum on the opposite side.

18. A boiler structure of the locomotive type comprising, in combination, the usual shell having flues contained therein; and a fire-box at one end of said shell for supplying heat to said flues comprising two upper drums, two lower drums, one on each side of the fire-box and water tubes connecting each lower drum to both of the upper drums.

19. A boiler having two upper drums at the top thereof, two lower drums, one on each side, a mud-ring below the lower drums and communicating therewith, water-tubes connecting the lower drum on each side with the upper drum on the opposite side and means to admit water to the boiler through said mud-ring.

20. A unitary boiler structure comprising, in combination, the usual shell having flues therein; and a fire-box at one end of said shell for supplying heat to said flues comprising upper drums, lower drums one on each side of the fire-box; a mud-ring below the lower drums and communicating therewith; water tubes connecting each lower drum with both upper drums; and means to admit water to the lower drums through the mud-ring.

21. A boiler having two upper drums separated from each other, a steam-drum contiguous, riveted and nippled to each of the upper drums, two lower drums, one on each side of the fire-box, water-tubes connecting the lower drum on each side with the upper drum on the opposite side and water legs connecting the upper drums to the lower drums.

22. A boiler having two upper drums at the top thereof and two lower drums, one at each side, each drum being provided with water-tube-receiving apertures, water-tubes connecting the lower drum on each side with the upper drum on the opposite side, the aperture in each drum being larger than the water-tube, and a bushing surrounding the water-tubes and filling said aperture.

23. In a boiler of the locomotive type, the combination with a shell, a flue-sheet at the end thereof, flues extending therethrough and through the shell, drums secured at one end to said flue-sheet and forming the top of the fire-box, two lower drums, one at each side of the fire-box, and water-tubes connecting each lower drum with the upper drum on the opposite side of the fire-box.

24. In a boiler of the locomotive type, the combination with a boiler shell having a flue-sheet at one end, of flues extending therethrough and through the shell, said flue-sheet projecting below the shell, another sheet forming with the projecting portion of the flue-sheet a water-leg, two drums secured at one end to said flue-sheet and forming the top of the fire-box, two lower drums, one on each side of the fire-box, and water-tubes connecting said drums.

25. In a boiler of the locomotive type, the combination with a boiler shell having a flue-sheet at one end, of flues extending therethrough and through the shell, said flue-sheet projecting below the shell, another sheet forming with the projecting portion of the flue-sheet a water-leg, two drums secured at one end to said flue sheet and forming the top of the fire-box, two lower drums, one on each side of the fire-box, and water-tubes connecting said drums, said lower drums communicating with said water-leg.

26. In a boiler of the locomotive type, the combination with a boiler shell having a flue-sheet at one end of flues extending therethrough and through the shell, said flue-sheet projecting below the shell, another sheet forming with the projecting portion of the flue-sheet a water-leg, two drums secured at one end to said flue-sheet and forming the top of the fire-box, two lower drums, one on each side of the fire-box, water-tubes connecting said drums, said lower drums communicating with said water-leg, and a water-leg at each side of the boiler connecting the upper and lower drums at said side.

27. In a boiler of the locomotive type, the combination with a boiler shell having a flue-sheet at one end, flues extending therethrough and through the shell, said flue-sheet projecting below the shell, another sheet forming with the projecting portion of the flue-sheet a water-leg, two drums forming the top of the fire-box and each secured at one end to said flue-sheet, two lower drums one on each side of the fire-box, water-tubes connecting said drums, and a mud-ring below the lower drums and communicating therewith and with the water-leg.

28. In a boiler of the locomotive type, the combination with a boiler shell of a fire-box at one end thereof, a water-leg at the back of the fire-box, means affording communication between the interior of the shell and the water-leg, drums at the top of the fire-box, two lower drums one on each side of the fire-box, water-tubes connecting the upper and lower drums, and a mud-ring below the lower drums, said mud-ring communicating both with the water-leg and with said drums.

29. In a boiler of the locomotive type, the combination with a boiler shell having flues therethrough, of a fire-box at one end of the shell, a water-leg at the back of the fire-box below the shell, means to deliver water from the upper portion of the shell to said water-leg, upper drums forming the top of the fire-box, two lower drums one at each side of the fire-box, said lower drums communicating with the water-leg, and water-tubes connecting the upper and lower drums.

30. In a boiler of the locomotive type, the combination with a boiler shell having flues therethrough of a fire-box at one end of the shell, a water-leg at the back of the fire-box below the shell, means to deliver water from the upper portion of the shell to said water-leg, upper drums forming the top of the fire-box, two lower drums one at each side of the fire-box, said lower drums communicating with the water-leg, water-tubes connecting the upper and lower drums, and other water-legs at the sides of the fire-box communicating with the upper and lower drums.

31. In a boiler of the locomotive type, the combination with a boiler shell having flues therethrough of a fire-box at one end of the shell, a water-leg at the back of the fire-box below the shell, means to deliver water from the upper portion of the shell to said water-leg, upper drums forming the top of the fire-box, two lower drums one at each side of the fire-box, water-tubes connecting the upper and lower drums, and a mud-ring below the lower drums, said mud-ring communicating with said drums and with the water-leg.

32. In a boiler of the locomotive type, the combination with a boiler shell of a fire-box at one end of the shell, a water-leg at the back of the fire-box below the shell, upper drums forming the top of the fire-box, two lower drums one at each side of the fire-box, water-tubes connecting the upper and lower drums, water-legs at the sides of the fire-box connecting the upper and lower drums, and a water-leg forming the door end of the fire-box, said latter water-leg communicating with both the upper and lower drums.

In testimony whereof, I affix my signature in the presence of two witnesses.

JAMES M. McCLELLON.

Witnesses:
HENRY T. WILLIAMS,
ROBERT H. KAMMLER.